United States Patent [19]

Gery et al.

[11] Patent Number: 4,919,194
[45] Date of Patent: Apr. 24, 1990

[54] METHOD OF PUTTING A TOOL-CARRYING ROBOT INTO POSITION IN A CONTAINMENT VESSEL

[75] Inventors: Daniel E. Gery, Cormeilles En Parisis; Philippe Meunier, L'Etang La Ville, both of France

[73] Assignee: Societe Anonyme Dite Hispano Suiza, Saint Cloud, France

[21] Appl. No.: 296,695

[22] Filed: Jan. 13, 1989

[30] Foreign Application Priority Data

Jan. 14, 1988 [FR] France ................... 88 00344

[51] Int. Cl.$^5$ .................... B25J 3/00; B25J 15/04
[52] U.S. Cl. ..................... 165/1; 165/11.2; 414/4; 901/1; 901/15; 901/44; 376/260
[58] Field of Search ............. 165/11.2, 76, 1; 901/1, 901/15, 44; 414/4; 376/260

[56] References Cited

U.S. PATENT DOCUMENTS

| | | | |
|---|---|---|---|
| 4,168,782 | 9/1979 | Sturges, Jr. | 901/15 |
| 4,179,035 | 12/1979 | Francois et al. | 901/15 |
| 4,561,816 | 12/1985 | Dingess | 165/11.1 |
| 4,585,388 | 4/1986 | Gossain et al. | 901/1 |

FOREIGN PATENT DOCUMENTS 2375011 7/1978 France .

Primary Examiner—John Ford
Attorney, Agent, or Firm—Oblon, Spivak, McClelland, Maier & Neustadt

[57] ABSTRACT

The invention provides a method of positioning a robot intended to perform inspection and maintenance operations within a nuclear plant, and especially within a vessel of a pressurized-water reactor. The robot, which comprises an articulated arm, is controlled so that it initially attaches its head at one end of the arm to a support point having known coordinates. Then, supported on this point, the robot brings and attaches a foot-plate at the other end of the arm to a working support position having known coordinates adjacent the access opening of the vessel. The head is then released and the robot operated to move and position the head through the access opening and into the operating zone in the vessel.

8 Claims, 5 Drawing Sheets

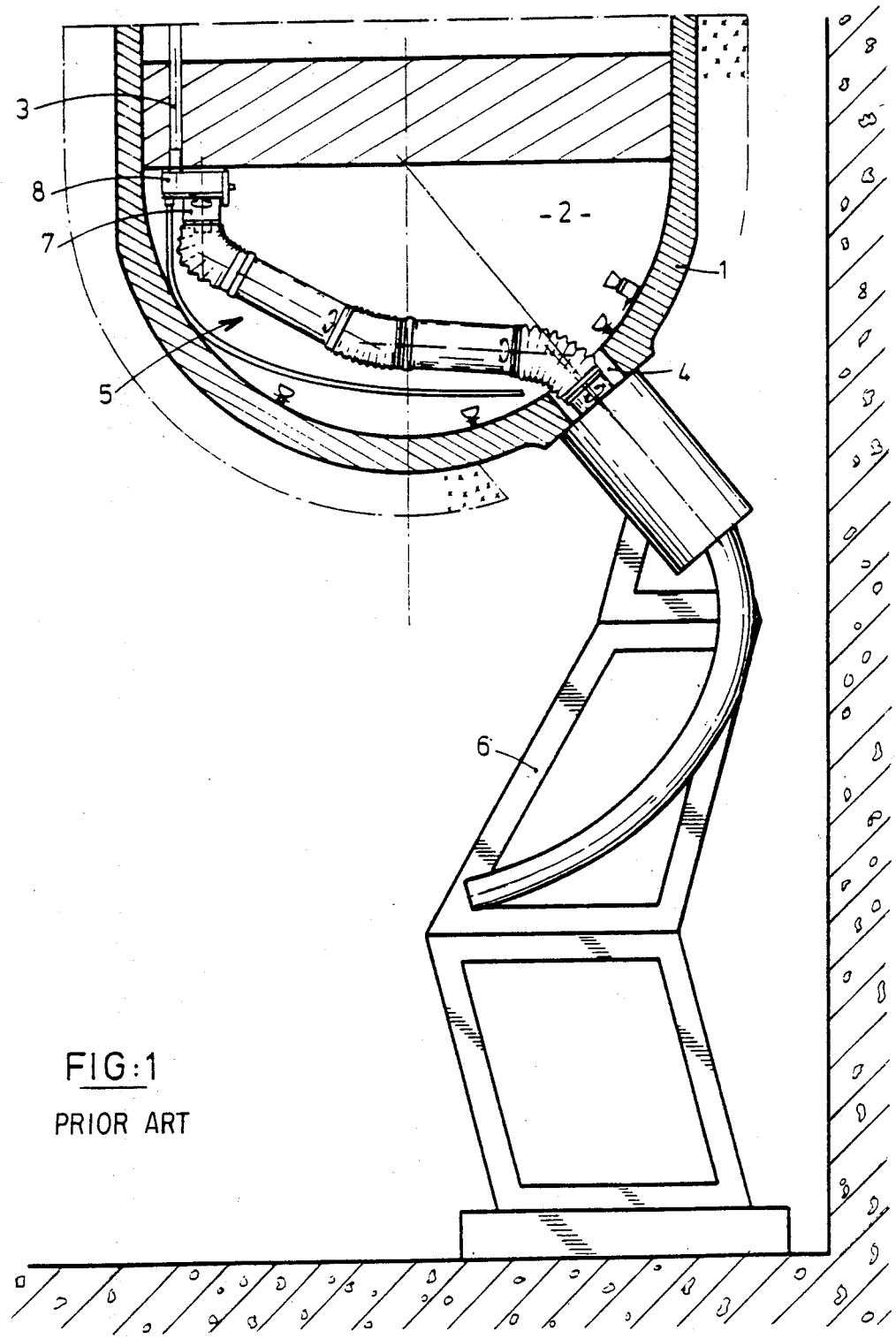
FIG:1
PRIOR ART

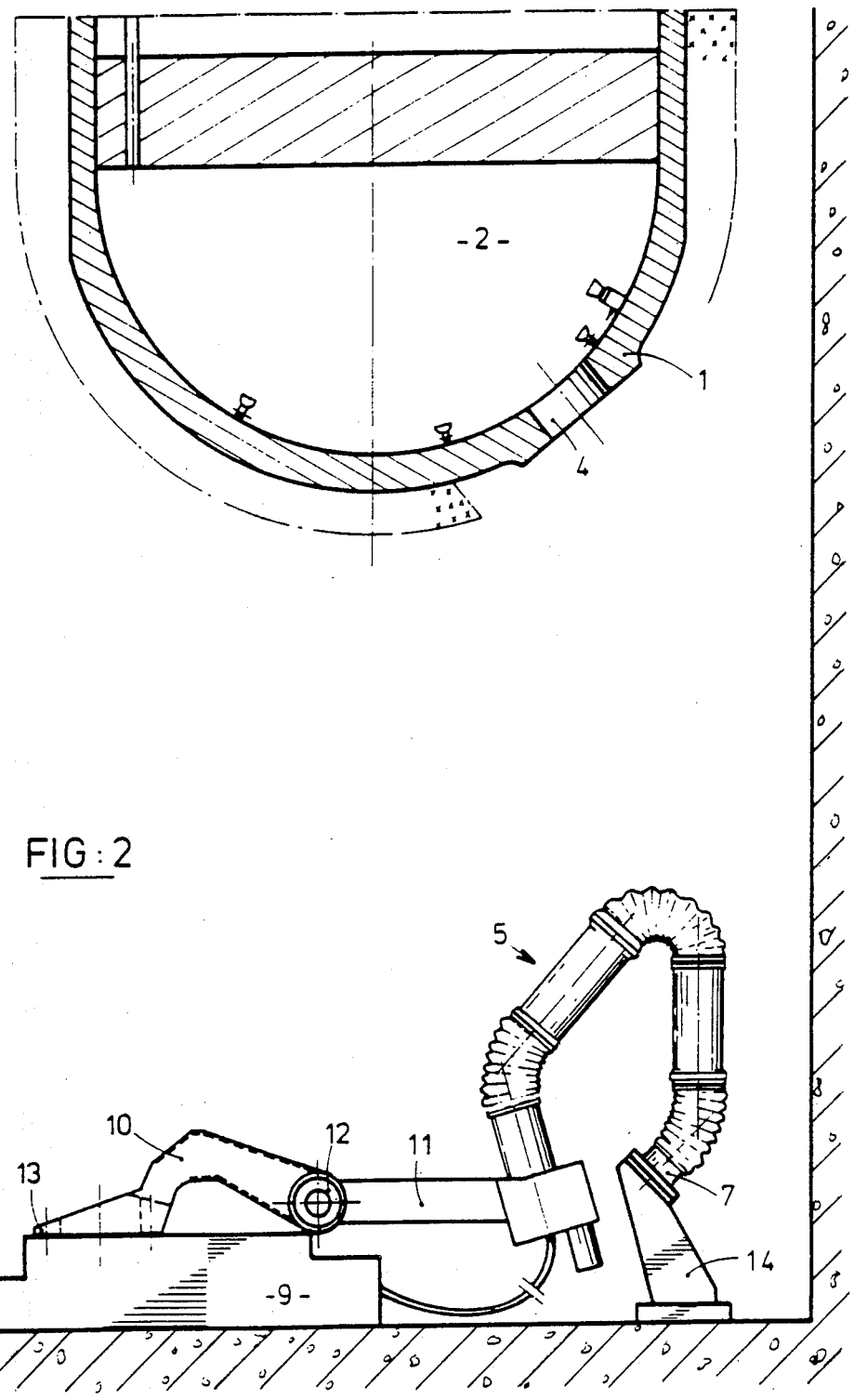
FIG:2

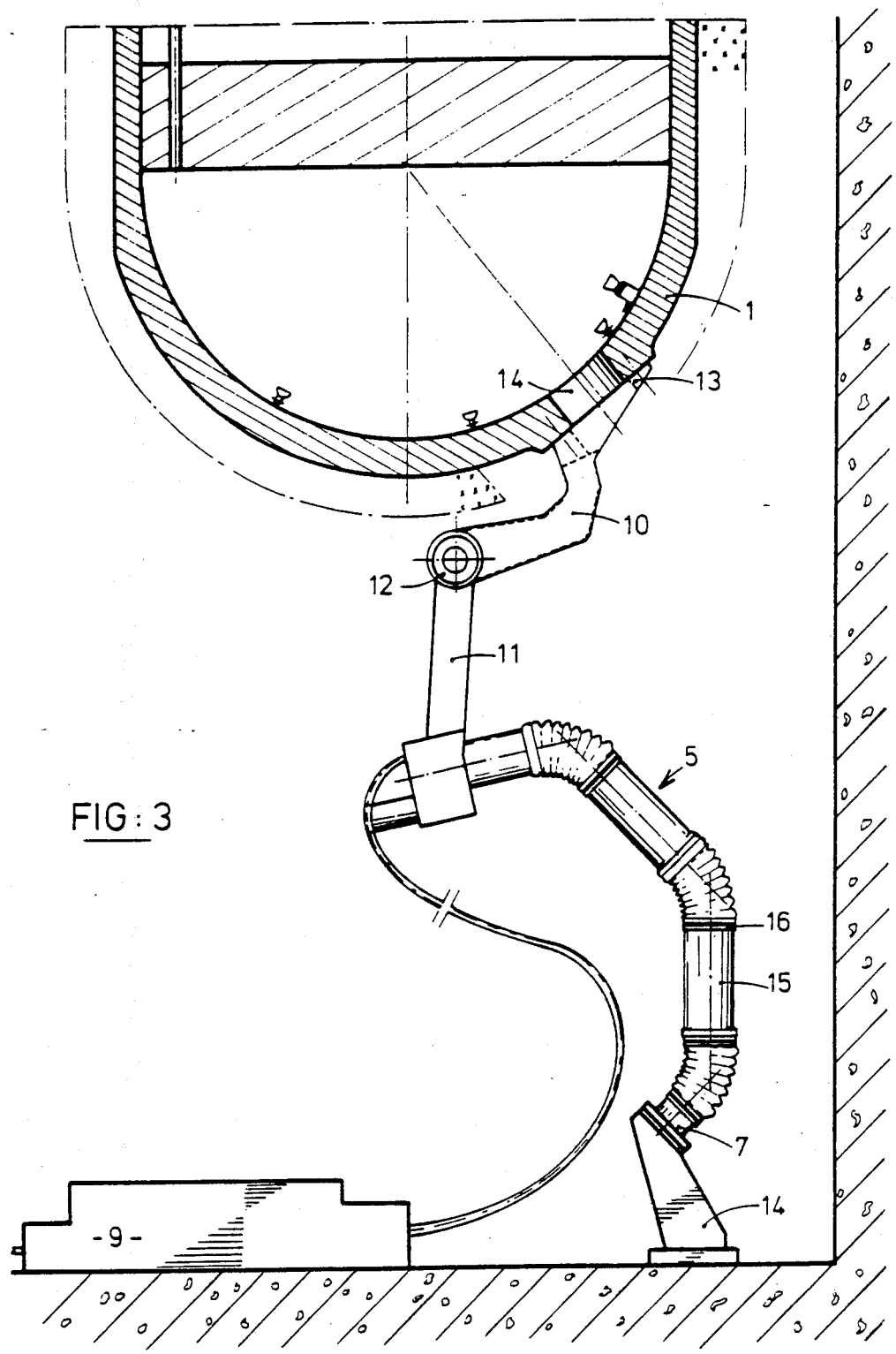
FIG: 3

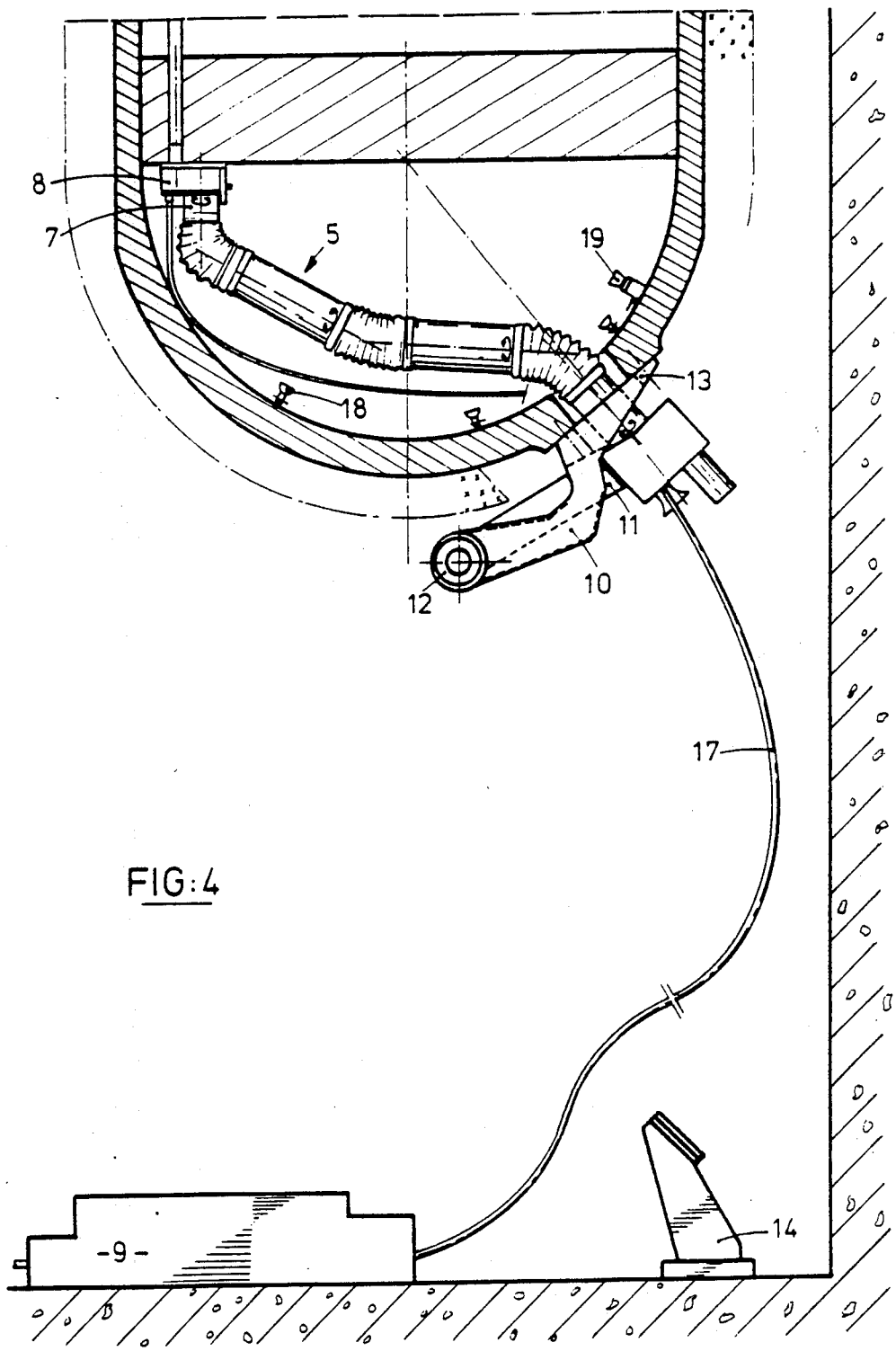
FIG:4

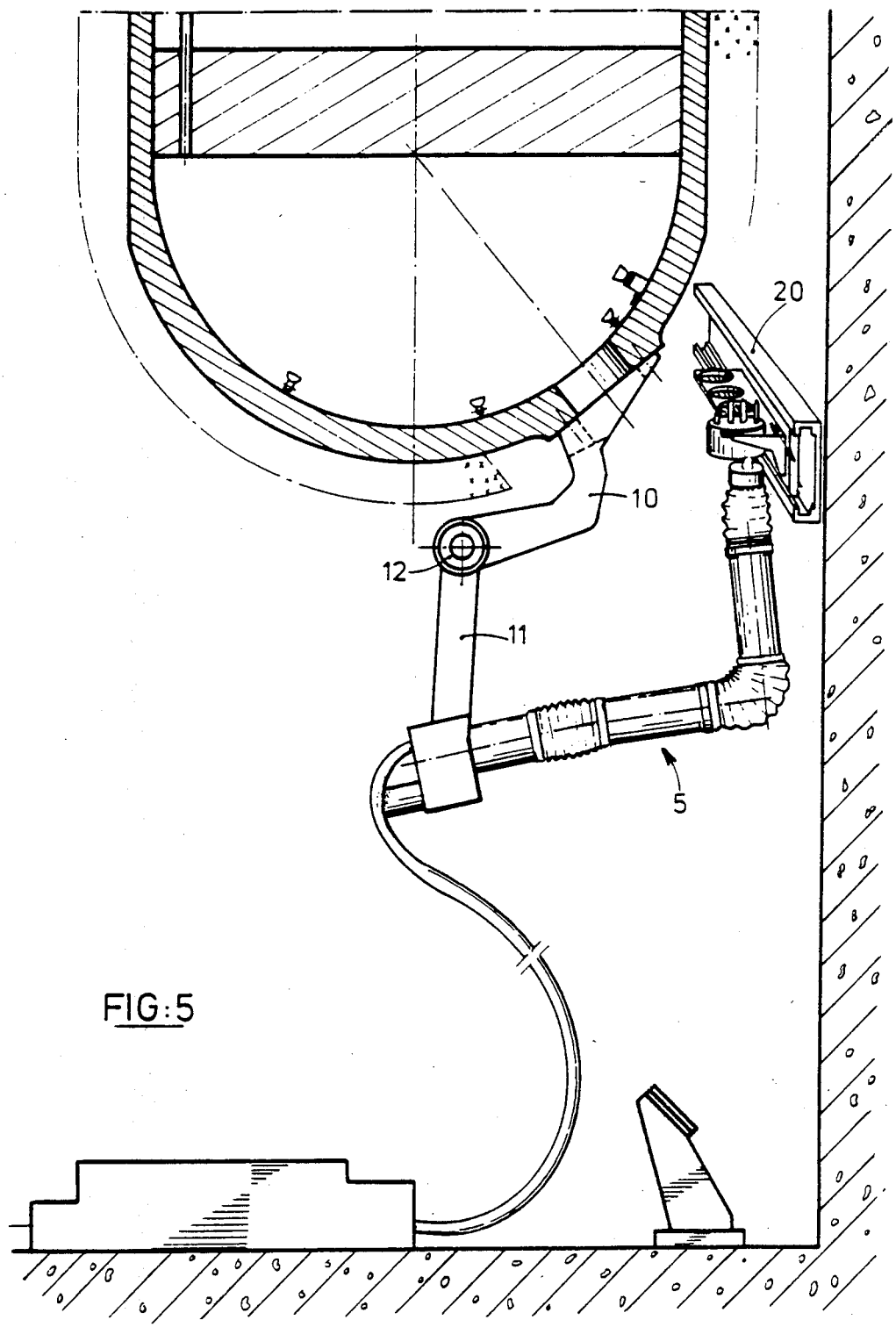
FIG:5

METHOD OF PUTTING A TOOL-CARRYING ROBOT INTO POSITION IN A CONTAINMENT VESSEL

BACKGROUND OF THE INVENTION

1. Field of the Invention

The invention relates generally to the performance of operations by robots in environments which are hostile to humans and, more particularly, it relates to a method of putting a robot into position in an operating zone within a containment vessel including an access opening. For example, inspection and maintenance operations are often carried out by robots in nuclear plants where people are allowed only under very stringent safety conditions. One such situation occurs in the maintenance of steam generators in pressurized-water nuclear power stations.

2. Summary of the Prior Art

For these operations, it has already been proposed to use a tool-carrying robot consisting of an articulated arm controlled by a logic unit. The base of the robot is fixed to a stand located underneath the vessel of the steam generator and having a certain amount of freedom of movement, thereby enabling the robot to be moved towards the access opening of the vessel and through which it reaches its operating location.

This known arrangement has a number of drawbacks. The stand constitutes a particularly heavy piece of equipment and does not allow one to have a known and stable frame of reference in time. Also, positioning of the robot device is a relatively long process, which is disadvantageous in terms of the period of time for which the plant may be shut down.

SUMMARY OF THE INVENTION

According to the invention, there is provided a method of placing in position a tool-carrying robot for carrying out operations in a containment vessel defining an operating zone in an environment which is hostile to humans, said containment vessel including an access opening to said operating zone, and said robot being of the kind comprising of an articulated arm, a foot-plate provided at one end of said arm for attachment at a first point with known co-ordinates outside said operating zone, a head provided at the other end of said arm for receiving the tools required for said operations to be carried out, and a central logic unit for controlling said articulated arm, said method comprising the steps of:

attaching the head of said robot at a second point having known coordinates outside said operating zone;

causing said robot to move independently so as to bring said foot-plate into a working position in the vicinity of said access opening while said head remains attached at said second point;

attaching said foot plate at said first point;

releasing said head from said second point; and causing said robot to fold back on itself so as to bring said head to a working position within said operating zone.

In a particularly advantageous embodiment, the attachment and release of the head and the foot-plate of the robot to and from their respective known fixing points is effected by the robot itself under the control of the central logic unit.

When the robot is used in a steam generator of a pressurized-water nuclear reactor, in which the access opening is provided with double protection consisting of a pressure resistant plate and, inwardly thereof, a contamination obturator, the pressure resistant plate is preferably removed before positioning the robot, and the foot-plate is attached by the robot to the first position using the elements for fixing said plate. Also, the head of the robot is preferably operated to remove the contamination obturator.

In order to be able to position itself close to the access opening, the foot-plate of the robot is preferably U-shaped.

After the foot-plate has been attached to the first point, the system of coordinates may be reset, taking as the frame of reference the access opening and identified points located inside the operating zone.

In order to implement the present method, it may be desirable to remove from the articulated arm the last element of the arm at the head end, and to use the fixing means for this element in order to attach the arm to the second point having known coordinates.

A non-limiting embodiment of the method in accordance with the invention will now be described, by way of example, in relation to the maintenance of the tubes of a steam generator of a pressurized-water nuclear reactor and with reference to the accompanying schematic drawings.

BRIEF DESCRIPTION OF THE DRAWINGS

FIG. 1 is a view showing a robot having an articulated arm disposed in a working position inside the vessel of a steam generator and supported in a known manner by means of a stand fixed to the ground.

FIG. 2 is a view illustrating a first stage in the positioning of a robot in the steam generator vessel by the method in accordance with the invention.

FIG. 3 is a view illustrating a second stage in the positioning of the robot in the vessel.

FIG. 4 is a view illustrating the end of a third stage in the positioning of the robot in the vessel, showing the robot in a working position.

FIG. 5 is a view showing the robot attached to the vessel and in a position where the tools are applied to the tool-carrying head.

DESCRIPTION OF THE PREFERRED EMBODIMENT

FIG. 1 shows the bottom part of a vessel 1 of a steam generator for a pressurized-water nuclear power station. This bottom part consists of a hemispherical space 2, called a water box, inside which emerge numerous heat exchanger tubes 3, only one of which has been shown for the sake of convenience. An access opening 4 is provided in the hemispherical enclosure. During normal operation, when the vessel is full of pressurized water, the access opening is closed by a double closure consisting of an outer pressure resistant plate and an inner contamination obturator. During section shut-downs, the entire water circuit is drained and the pressure resistant plate is removed, leaving only the contamination obturator which will be removed by the maintenance robot itself. FIG. 1 shows a tool-carrying robot 5, of the type consisting of an articulated arm, in a working position within the vessel 1. As shown, this robot 5 is fixed at its outer end to the top of a known stand 6 having a number of degrees of freedom of movement (upwards and downwards, and rotation).

The robot 5 is thus brought by the stand 6 into the vicinity of the vessel 1, into which it is able to penetrate via the access opening 4. The head 7 of the robot is equipped with a tool holder 8 which is able to receive accessories of different kinds in order to perform observation or repair operations, particularly with regard to the exchanger tubes 3 which require special maintenance.

The robot 5, with its articulated arm, may be of a known kind such as that already used by the Assignee, Hispano Suiza S.A., under the name ISIS in graphite-gas type installations. In the example shown, the robot arm is equipped with three hinge elements and three rotational elements.

In the embodiment of the method in accordance with the invention illustrated in FIGS. 2 to 5, a robot 5 identical to that shown in FIG. 1 is used.

FIG. 2 shows the first stage of the method in which the articulated arm robot 5 is brought to a predetermined position underneath the vessel 1 of the steam generator, by means of a carriage 9. The robot arm 5 is connected to the carriage 9 by means of a compass arrangement consisting of two arms 10 and 11 connected together by a hinge 12. The first arm 10, located on the carriage side, has a foot-plate 13 by means of which it is temporarily attached to the carriage. The end of the second arm 11 remote from the hinge 12 supports the articulated arm proper. Once the carriage 9 is in position, the drive mechanism of the robot 5 operates under the control of its central logic unit so as to unfold and lock its head 7 onto a support point 14 having known coordinates.

In the second stage shown in FIG. 3, the foot-plate 13 has freed itself from the carriage 9, and, with its head 7 supported by the support 14, the robot itself operates under the control of its central logic unit to position and fix the foot-plate 13 adjacent the opening 4 of the vessel 1. Ideally the pressure resistant plate which closes the opening 4 during normal operation will have been removed beforehand and the robot will be able to use the means for attaching said plate in order to attach the foot-plate 13. It will be appreciated that, with the opening 4 being circular, it is advantageous to form the foot-plate 13 with a U-shape.

In a variation of this embodiment of the method, a better result may be obtained by detaching the last element 15 of the arm 5 from the robot and using the attachment means 16 for this last element in order to attach the robot to the support 14. In this case, the number of articulations remaining is ample for the purposes of the first and second stages, and these articulations provide driving torques greater than would the last articulation if present. If necessary, depending on the environment and without departing from the invention, the support point 14 may be adapted to serve as a support, and hence as a frame of reference, for any articulation of the arm 5.

The last stage in the positioning of the robot is shown in FIG. 4. In reaching this stage the robot frees its head 7, or the particular articulation of the arm which is used, from the support 14 and, supported by the foot-plate 13, the robot arm folds back on itself, removes the contamination obturator, and inserts itself through the opening 4 to reach a working position inside the operating zone, all under the control of the central logic unit. In the working position, the arms 10 and 11 of the compass arrangement are closed together about the hinge 12, and the robot 5 is in a position similar to that in the known arrangement shown in FIG. 1, although in the present case the only connection to the ground is by way of the control cable 17.

When the head 7 passes through the opening 4, it is possible, using a suitable sensing tool, to reset the frame of reference of the control unit relative to a diameter of the opening. Thus, corrections are made to the robot trajectories, which are determined by means of computer-aided design (C.A.D.) and are stored in the central processing unit, and the robot will operate with a greater degree of precision. Similarly, using observation means, for example a video, it is possible to improve the precision of the system by observing points with known coordinates located in the interior 2 of the vessel 1. To this end, the customary presence of projectors 18 will be noted, which may be supplemented by a camera 19 for visually monitoring the work performed by the robot.

From the foregoing it will be readily understood that the robot positioning method in accordance with the invention results in a considerable reduction in weight compared with the known method shown in FIG. 1 which uses a stand 6. The positioning method in accordance with the invention also results in an appreciable reduction in the amount of time required to perform the planned maintenance work. This is particularly important in nuclear power stations, where the work has to be performed quickly since shutdowns of sections of nuclear power stations are very carefully scheduled and are very short in duration.

The presence of the compass arrangement consisting of the arms 10 and 11 and the hinge 12 is also useful for maneuvering the robot during its work. This is illustrated in FIG. 5, which shows the robot taking, from a store 20 provided for this purpose, the tools needed for the intended operation. It can be seen in this figure that the compass arrangement facilitates the inward and outward movements of the robot arm through the opening 4. Many inward and outward movements may be performed during the same maintenance operation.

In view of its ability to carry a very wide range of tools or instruments, its lightness and the ease with which it can be positioned, the robot and its positioning method is extremely versatile and may be used advantageously in a large number of different applications.

It will be appreciated that the central logic unit, which controls the positioning process, stores all the trajectories of the robot, automatically controls them, and also conducts all the calculations required for the various approach operations. However, the way in which this is done forms no part of the present invention and is not therefore described.

We claim:

1. A method of placing in position a tool-carrying robot for carrying out operations in a containment vessel defining an operating zone in an environment which is hostile to humans, said containment vessel including an access opening to said operating zone, and said robot being of the kind comprising an articulated arm, a foot-plate provided at one end of said arm for attachment at a first point with known coordinates outside said operating zone, a head provided at the other end of said arm for receiving the tools required for said operations to be carried out, and a central logic unit for controlling said articulated arm, said method comprising the steps of:

attaching the head of said robot at a second point having known coordinates outside said operating zone;

causing said robot to move independently so as to bring said foot-plate into a working position in the vicinity of said access opening while said head remains attached at said second point and said robot remains outside said access opening;

attaching said foot-plate at said first point;

releasing said head from said second point; and causing said robot to fold back on itself so as to bring said head to a working position within said operating zone.

2. A method as claimed in claim 1, wherein said steps of attaching said head to said second point and releasing said head from said second point are effected by said robot itself.

3. A method as claimed in claim 1, wherein said first point is located close to said access opening and said step of attaching said foot-plate to said first point is effected by said robot itself.

4. A method as claimed in claim 3, wherein said containment vessel is provided with double protection for said access opening comprising a pressure resistant plate and, inwardly of said plate, a contamination obturator, said pressure resistant plate is removed before said robot is placed in position, and said robot attaches said foot-plate to said first position using the means for attaching said pressure resistant plate.

5. A method as claimed in claim 4, wherein said robot causes said head to remove said contamination obturator after said foot-plate is attached to said first point and said head is released from said second point.

6. A method as claimed in claim 1, wherein said foot-plate is generally U-shaped and is adapted to surround said access opening when said foot-plate is attached at said first point.

7. A method as claimed in claim 1, wherein the coordinate system with respect to which said robot is moved is reset when said robot brings said head into said operating zone by taking the diameter of said access opening as a reference and identifying known points located inside said operating zone.

8. A method as claimed in claim 1, wherein an element of said articulated arm adjacent said head is removed, and said arm is attached to said second point by the means for fixing said element to said arm.

* * * * *